W. KRIZ.
KITCHEN KNIFE.
APPLICATION FILED JUNE 25, 1915.
1,209,725.
Patented Dec. 26, 1916.
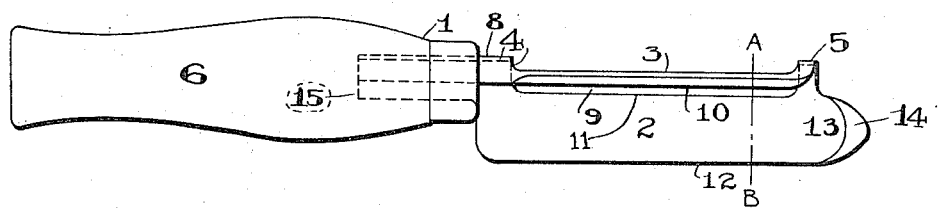
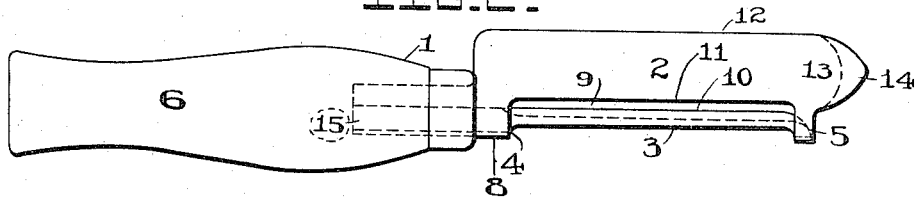
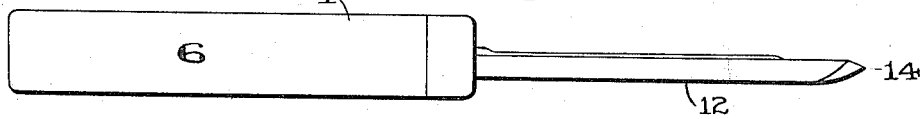
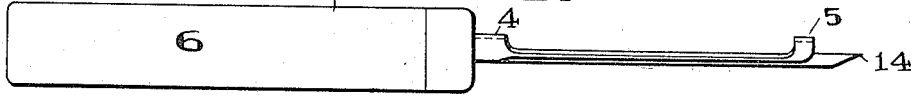
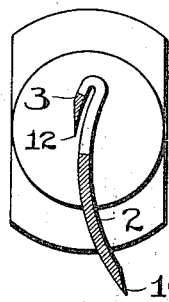
WITNESSES
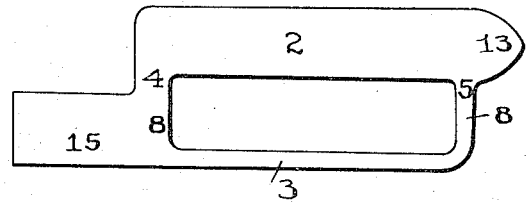
INVENTOR
WILLIAM KRIZ

UNITED STATES PATENT OFFICE.

WILLIAM KRIZ, OF ST. LOUIS, MISSOURI.

KITCHEN-KNIFE.

1,209,725.  Specification of Letters Patent.  Patented Dec. 26, 1916.

Application filed June 25, 1915. Serial No. 36,166.

*To all whom it may concern:*

Be it known that I, WILLIAM KRIZ, a citizen of the United States, residing in the city of St. Louis, State of Missouri, have invented new and useful Improvements in Kitchen-Knives, of which the following is a specification, reference being had to the accompanying drawings.

My invention relates to that class of knives used for the paring of fruit and vegetables and the slicing of the same, as well as for general kitchen purposes, and has for its main object the production of such a knife in combination form for the several purposes outlined, which may be stamped from a single piece of sheet metal and assembled in a simple, cheap and practical form. With this and other objects in view, attention is called to the accompanying drawings, which are to be considered in connection with this specification, and wherein—

Figure I represents a rear elevation of my improved knife; Fig. II a front elevation; Fig. III a front edge view; Fig. IV a back edge view; Fig. V a cross section through the line $a\,b$ on Fig. I; Fig. VI the flat form of the sheet metal after being stamped and before same is bent into shape.

Referring more particularly to the drawings, 1 represents my improved knife as a whole, made up of the forward blade 2, the rear blade 3, the connecting links 4 and 5 and the handle 6. As stamped from a single piece of metal the general form of the blank is substantially as shown in Fig. 6, being approximately rectangular with a handle shank projecting from one corner of one end and a gouge extension projecting from the diagonally opposite corner of the other end. A large rectangular slot is formed in the blank and the gouge extension is practically a continuation of the forward blade 2. When so stamped out, the right hand or narrow portion of the metal is bent and curved downward and then forward upon the remainder of the blank, forming the rear blade 3, the bending taking effect at a point 8, approximately central on the connecting links 4 and 5, and a small space 9 being left between the forward edge 10 of said rear blade 3 when so bent down and forward, and the rear edge 11 of the forward blade 2. The forward blade 2 is upwardly curved so that the edge 12 thereof is elevated as the knife rests upon the fruit or vegetable, in use. Both the forward blade 2 and the rear blade 3 have their edges 12 and 10 suitably sharpened. The outer projection 13 is also sharpened all around its edge 14. The handle projection 15 may be stamped in form and size to constitute a complete handle in itself, or it may be merely in the form of a prong upon which is affixed a wooden handle. The finished knife is curved in cross section as shown in Fig. 5, the two blades curving in correspondence with the narrower blade 3 slightly separated from the wider blade 2.

In use, when it is desired to peel any vegetable or fruit the knife is taken by its handle in the right hand, the fruit or vegetable in the left hand, and the rear blade 3 cuts off the paring which passes upward through the space 9. When it is desired to slice the same fruit or vegetable the forward blade 2 is brought into operation, in general as any ordinary knife would be used for the same purpose. When it is desired to gouge out the eyes of potatoes, or for similar purposes, the outer projection 13 is brought into use.

Although I have herein described certain specific methods for forming my improved knife, it is understood that I may modify same in minor details, not departing from the spirit of my invention, so as best to construct the same to meet all practical demands.

What I claim as new and patentable is:

A paring knife formed from a rectangular blank with a gouge extension projecting from one corner of one end thereof and a handle shank extending from the diagonally opposite corner of the other end, said blank being provided with a rectangular slot and having its opposite side edges sharpened and being adapted to have its narrower side portion bent upon itself to extend partially over the rectangular slot to form a paring blade and the wider side portion forming a cutting blade, said blades being transversely curved.

WILLIAM KRIZ.

Witnesses:
LEE LICHTENSTEIN,
S. L. COLESWORTHY.